United States Patent
Weng et al.

(10) Patent No.: US 8,507,926 B2
(45) Date of Patent: Aug. 13, 2013

(54) LIGHT EMITTING DIODE PACKAGE

(75) Inventors: Chao-Hung Weng, Hsinchu (TW);
Fu-Ming Chuang, Hsin-Chu (TW)

(73) Assignee: Coretronic Corporation (TW)

( * ) Notice: Subject to any disclaimer, the term of this patent is extended or adjusted under 35 U.S.C. 154(b) by 510 days.

(21) Appl. No.: 12/659,419

(22) Filed: Mar. 9, 2010

(65) Prior Publication Data

US 2010/0244058 A1  Sep. 30, 2010

(30) Foreign Application Priority Data

Mar. 25, 2009  (TW) ............................... 98109662 A

(51) Int. Cl.
*H01L 21/18*  (2006.01)
*H01L 33/00*  (2010.01)

(52) U.S. Cl.
USPC .................. 257/88; 257/98; 257/E33.001

(58) Field of Classification Search
USPC ....................... 257/88, E33.001, 98
See application file for complete search history.

(56) References Cited

U.S. PATENT DOCUMENTS

| 7,364,338 | B2 | 4/2008 | Chang |
| 7,385,653 | B2 | 6/2008 | Kim et al. |
| 7,414,270 | B2 | 8/2008 | Kim et al. |
| 7,458,703 | B2 * | 12/2008 | Han et al. ............ 362/267 |
| 2002/0190262 | A1 * | 12/2002 | Nitta et al. ............ 257/99 |

FOREIGN PATENT DOCUMENTS

| TW | I255566 | 5/2006 |
| TW | M309750 | 4/2007 |
| TW | 200815794 | 4/2008 |
| TW | 200823557 | 6/2008 |
| TW | 200836368 | 9/2008 |
| TW | 200905316 | 2/2009 |

OTHER PUBLICATIONS

Office Action mailed from Taiwan Intellectual Property Office dated Jun. 27, 2012.

* cited by examiner

*Primary Examiner* — Chuong A Luu
*Assistant Examiner* — Nga Doan
(74) *Attorney, Agent, or Firm* — Bacon & Thomas, PLLC

(57) ABSTRACT

A light emitting diode package includes a substrate, a plurality of light emitting diode chips, a fluorescence layer, and a plurality of reflecting layers. The light emitting diode chips, the fluorescence layer, and the reflecting layers are disposed on the substrate. The fluorescence layer covers the light emitting diode chips, and the reflecting layers are disposed right above the light emitting diode chips, respectively.

10 Claims, 6 Drawing Sheets

LIGHT EMITTING DIODE PACKAGE

BACKGROUND OF THE INVENTION (1) Field of the Invention

The invention relates to a light emitting diode package, and more particularly to a light emitting diode package of a backlight module.

(2) Description of the Related Art light emitting diode (LED) is a kind of semiconductor component, and is popularized as light source of a backlight module in a display due to small size, long life, low driving voltage, quick response, good seismic resistance, and ability to meet requirements of lightness, thinness and miniaturization of various devices. Light source of the backlight module in the display of common information products is always white light, so that the light emitting diode needs to generate uniform white light. In the current backlight module, white light is generated by mixing light generated from the light emitting diodes at entrance of the light guide plate.

Refer to FIG. 1 for a profile view of a conventional light emitting diode package 50 applied in a backlight module 100. The light emitting diode package 50 applied in the backlight module 100 is disposed near a light incident side 111 of a light guide plate 110. For the light beam from the light emitting diode package 50 is mixed unevenly at the light incident side 111 of the light guide plate 110, so that a dark region D is generated, and the light guide plate 110 is lengthened for providing a light mixing distance L1. In the area of the light mixing distance L1, the light beam from the light emitting diode package 50 is mixed to generate white light for entering a display distance L2.

For resolving the problem of mixing light unevenly at the light incident side 111 of the light guide plate 110 due to the disposal of the light emitting diode package 50 in FIG. 1, another conventional light emitting diode package 60 applied in a backlight module 200 is provided in FIG. 2. The light emitting diode package 60 includes a plurality of light emitting diode chips 60a, 60b and 60c.

The light emitting diode package 60 is disposed near a light incident side 211 of a light guide plate 210, and is formed by sequential stack of the light emitting diode chips 60a, 60b and 60c. The light emitting diode chips 60a, 60b and 60c respectively provides illuminating areas A1, A2, and A3 in different directions. The stacked light emitting diode packages 60a, 60b, and 60c in different directions make the light beam of the light emitting diode package 60 emit out in a wide angle, so that the light emitting diode package 60 solves the problem of mixing light unevenly in the light emitting diode package 50 of the backlight module 100 in FIG. 1.

However, in disposal of the conventional light emitting diode package 50 applied in the backlight module 100, the light guide plate 110 is lengthened for mixing light uniformly; for the stack structure of the light emitting diode package 60 in the backlight module 200, the light guide plate 210 is thicken, and accordingly enlarge the size of the backlight modules 100 and 200.

Thus, how to improve the light mixing efficiency of the backlight module and also avoid enlarging the size of the backlight module are urgent problems in the art.

SUMMARY OF THE INVENTION

Accordingly, the invention is to provide a light emitting diode package for achieving uniform mixing light.

One embodiment of the invention provides a light emitting diode package includes a substrate, a plurality of light emitting diode chips, a fluorescence layer, and a plurality of reflecting layers. The light emitting diode chips, the fluorescence layer, and the reflecting layers are disposed on the substrate. The fluorescence layer covers the light emitting diode chips, and the reflecting layers are disposed above the fluorescence layer and right above the light emitting diode chips, respectively. The reflecting layers are disposed on a same level, and each of the reflecting layers is a diffusion reflecting layer with high reflectivity, high diffusivity and low transmittance.

In an embodiment, the profile of each of the reflecting layer is selected from a group consisting of a semicircle, a circular arc, and a polygon with an arc. Each lower surface of the reflecting layers faces the light emitting diode chip, the lower surfaces are coated by a plurality of diffusion particles, and material of the diffusion particles is selected from a group consisting of silicon dioxide ($SiO_2$) and polymethyl methacrylate (PMMA).

In an embodiment, the light emitting diode package further includes a diffusion layer disposed above the fluorescence layer. The diffusion layer has a plurality of thick parts and a plurality of thin parts. The thick parts are disposed right above the light emitting diode chips, and the thin parts are disposed between two adjacent reflecting layers respectively. The surface of the thick part contacting the fluorescence layer is selected from the group consisting of a semicircle, a circular arc, and a polygon with an arc.

In an embodiment, the surface of the diffusion layer is selected from the group consisting of a semicircle, a circular arc, and a polygon with an arc.

In an embodiment, the diffusion layer includes a plurality of diffusion particles, and the material of the diffusion particles is selected from the group consisting of silicon dioxide ($SiO_2$) and polymethyl methacrylate (PMMA).

In an embodiment, the surface of the diffusion layer is a blasting-sand structure.

In an embodiment, the fluorescence layer includes a red fluorescence layer, a green fluorescence layer, and a blue fluorescence layer.

Compared to the conventional, each of the reflecting layer is capable of reflecting the light beam back to the fluorescence layer in the invention, so that the light beam with high directivity is emitted out between two adjacent light emitting diode chips after back and forth movement in the fluorescence layer so as to improve uniformity of the white light L' emitted from the light emitting diode package and solves the problem of big size of the lengthened or thickened light guide plate when the light emitting diodes are disposed in the light guide plate of the conventional backlight module.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The invention will now be specified with reference to the embodiment illustrated in the drawings, in which.

DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component directly or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
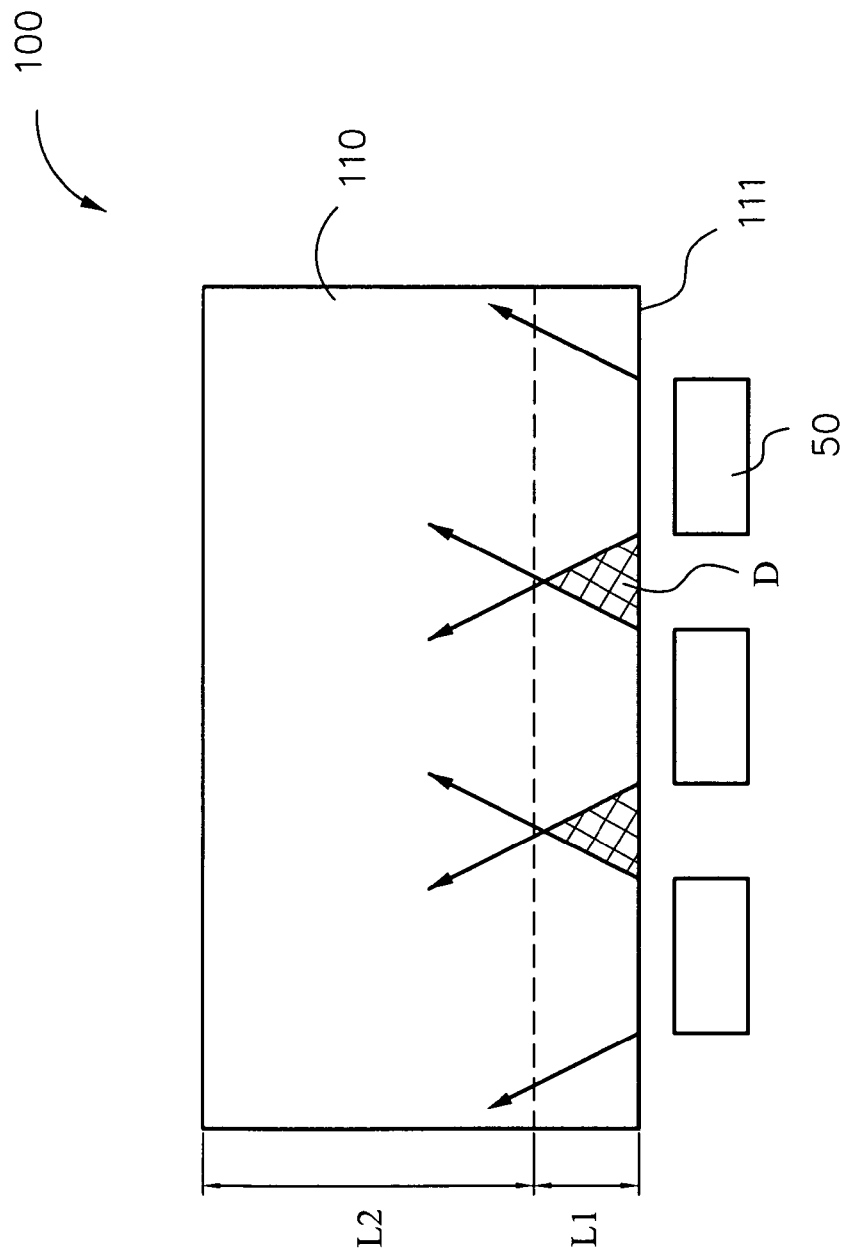
FIG. 1 is a profile view of a conventional light emitting diode package adapted to a backlight module.
Figure 2:
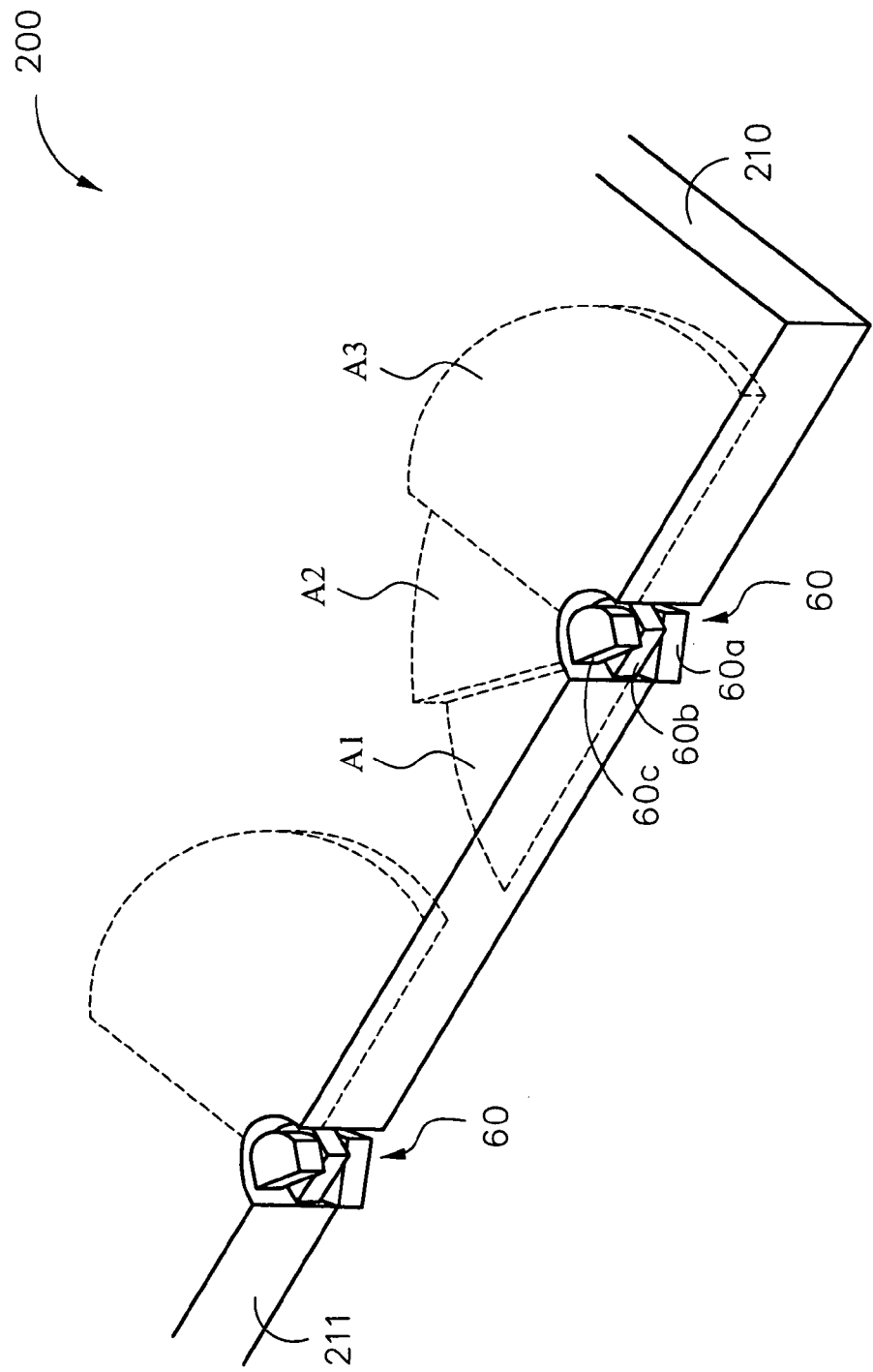
FIG. 2 is a profile view of another conventional light emitting diode package adapted to a backlight module.
Figure 3:
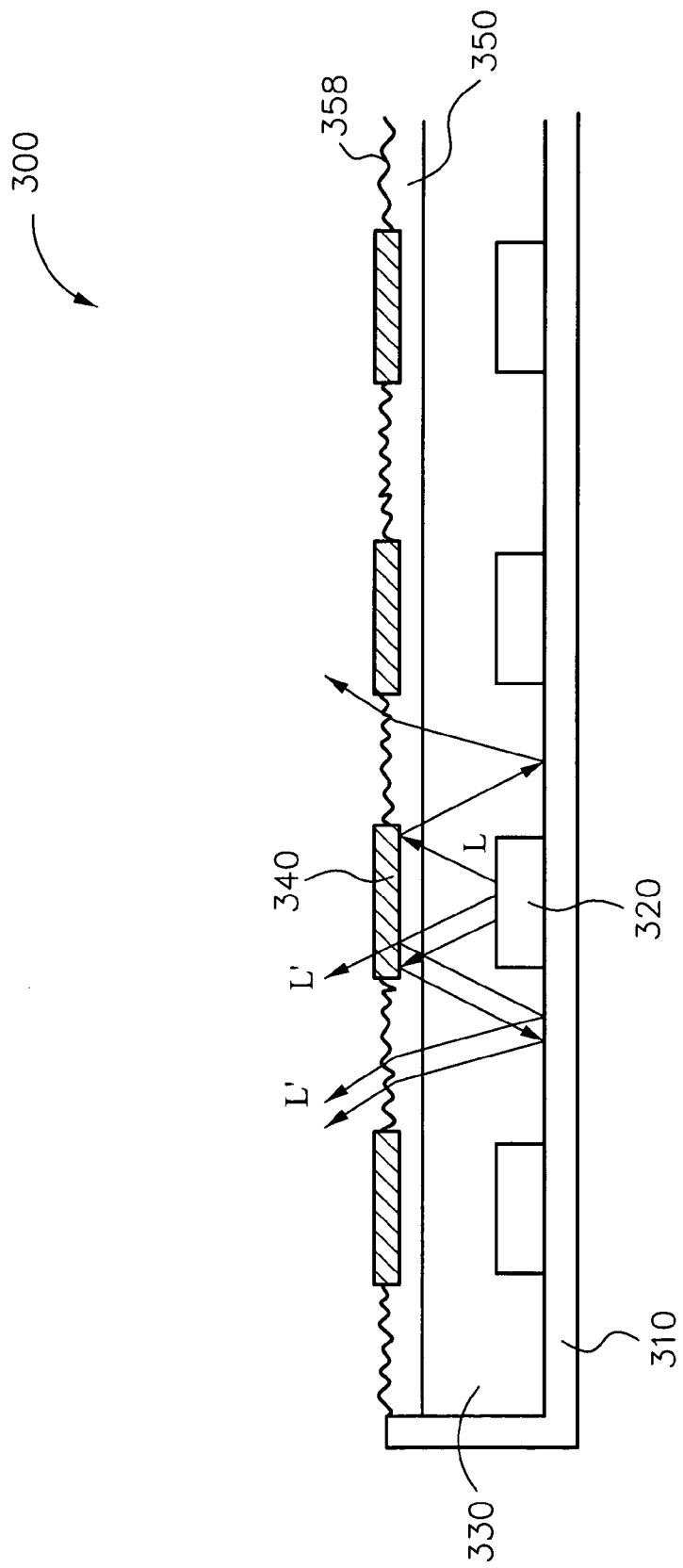
FIG. 3 is a sectional view of the first embodiment of the light emitting diode package according to the invention.

Referring to FIG. 3, the light emitting diode package 300 includes a substrate 310, a plurality of light emitting diode chips 320, a fluorescence layer 330, and a plurality of reflecting layers 340.

The substrate 310 is a long strip and has a space. A plurality of light emitting diode chips 320 are disposed on the substrate 310 and arranged in the space. The light emitting diode chips 320 are such as highlight red light emitting diode chips or highlight infrared light emitting diode chips made of AlGaAs; highlight red light emitting diode chips, highlight orange light emitting diode chips, highlight yellow light emitting diode chips or high yellow-green light emitting diode chips made of AlGaInP; highlight dark green light emitting diode chips, highlight blue light emitting diode chips, highlight purple light emitting diode chips or high ultraviolet light emitting diode chips made of GaInN.

The fluorescence layer 330 is disposed on the substrate 310 and inside the space of the substrate 310. The fluorescence layer 330 covers the light emitting diode chips 320 so that the light beam L generated by the light emitting diode chips 320 is capable of stimulating the fluorescence layer 330 to generate white light L'. By Phosphor Converted-light emitting diode technology, the light beam L generated by the light emitting diode chips 320 is converted into the white light L' by combination of the yellow fluorescence layer and the blue light emitting diode chip; the red fluorescence layer and the green light emitting diode chip; or the green fluorescence layer and the red light emitting diode chip. The fluorescence layer 330 is made of Nitride or Oxy-nitride.

A plurality of reflecting layers 340 are disposed on the fluorescence layer 330 and right above the light emitting diode chips 320 respectively. The reflecting layers 340 are diffusion reflecting layers with high reflectivity, high diffusivity, and low transmittance. When the light beam L generated by the light emitting diode chips 320 reaches the reflecting layer 340 through the fluorescence layer 330, a small part of the light beam L directly penetrates the reflecting layer 340 to emit out, a large part of the light beam L is reflected by the reflecting layer 340 to the fluorescence layer 330, and then the large part of light beam L is emitted out between two adjacent reflecting layers 340.

After reflected by the reflecting layer 340 and diffused back to the fluorescence layer 330, the light beam L generated by the light emitting diode chips 320 with high directivity is emitted out of the fluorescence layer 330 after back and forth movement in the fluorescence layer 330 so as to improve uniformity of the white light L' of the light emitting diode package 300.

In an embodiment, the light emitting diode package 300 further includes a diffusion layer 350 disposed on the fluorescence layer 330 and a reflecting layer 340 disposed on the diffusion layer 350. The surface of the diffusion layer 350 is a blasting-sand structure 358 for diffusing. Thus, the emitting angle and path of the light beam L generated by the light emitting diode chips 320 may be changed by the diffusion layer 350 so as to generate uniform white light L'. The diffusion layer 350 also includes a plurality of diffusion particles. The light beam L may be diffused by the diffusion particles. The diffusion particles are made of silicon dioxide ($SiO_2$), polymethyl methacrylate (PMMA), or both of them.

Figure 4:
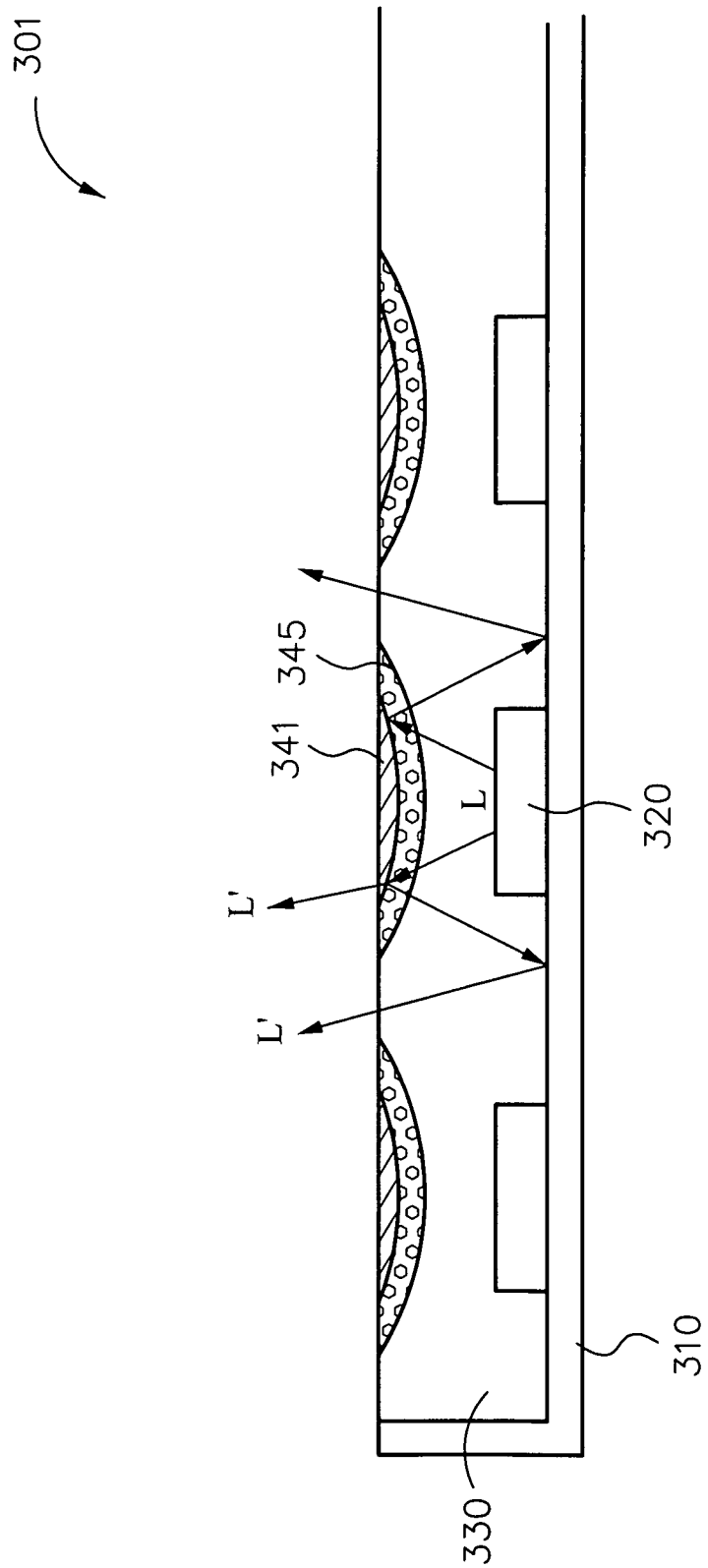
FIG. 4 is a sectional view of the second embodiment of the light emitting diode package according to the invention.

Referring to FIG. 4, compared with the planar reflecting layer 340 in FIG. 3, the embodiment of the invention uses a circular reflecting layer 341 to enlarge the emitting angle of the light beam L emitted out of the fluorescence layer 330 for improving emergence efficiency for wide angle and light mixing efficiency of the light emitting diode package 301. The profile of the reflecting layer 341 is a semicircle, a circular arc, or a polygon with an arc. The reflecting layer 341 is a diffusion reflecting layer with high reflectivity, high diffusivity, and low transmittance. Thus, when the light beam L from the light emitting diode chips 320 reaches the reflecting layer 341 through the fluorescence layer 330, a small part of the light beam L directly penetrates the reflecting layer 341 to emit out, a large part of the light beam L is reflected back to the fluorescence layer 330, and then the large part of the light beam L is emitted out between two adjacent reflecting layer 341.

In an embodiment, the lower surface of the reflecting layer 341 faces towards the light emitting diode chips 320, and is coated with a plurality of diffusion particles 345 for diffusing a small part of the light beam L and improving the uniformity of the white light L' of the light emitting diode package 301. The diffusion particles 345 are made of $SiO_2$, PMMA, or both of them.

Figure 5:
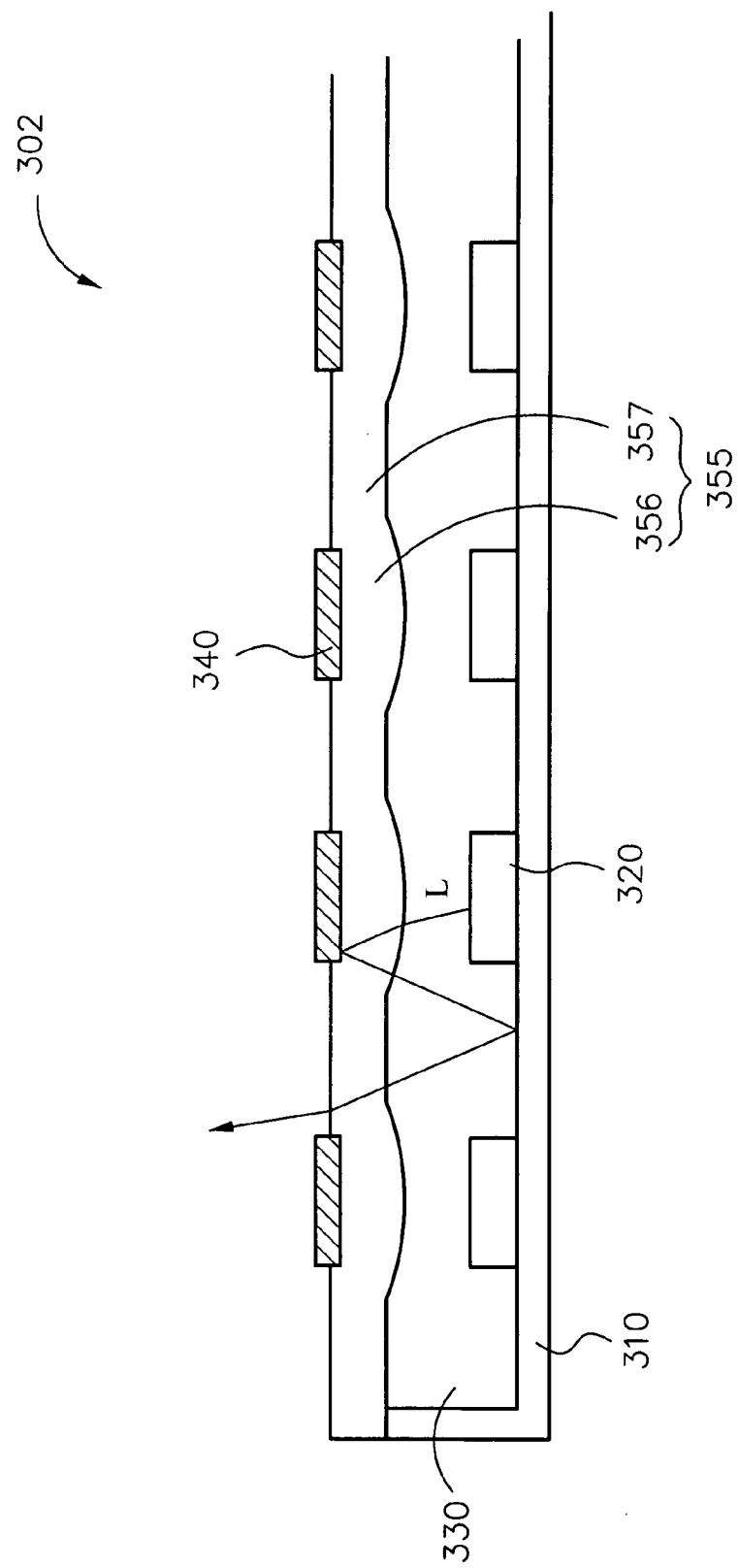
FIG. 5 a sectional view of the third embodiment of the light emitting diode package according to the invention.

Referring to FIG. 5, compared with the light emitting diode package 300 in FIG. 3, the light emitting diode package 320 further includes a diffusion layer 355 replacing the diffusion layer 350 in FIG. 3. The diffusion layer 355 has a plurality of thick parts 356 and a plurality of thin parts 357. The thick parts 356 are thicker than the thin parts 357. The thick parts 356 are disposed right above the light emitting diode chips 320 and right under the reflecting layers 340 respectively. Each of the thick parts 356 is disposed between the corresponding light emitting diode chip 320 and the corresponding reflecting layer 340, and each thin part 357 is disposed between two adjacent reflecting layers 340. The surface of the thick part 356 contacting the fluorescence layer 330 is a semicircle, a circular arc, or a polygon with an arc.

After the light beam L generated by the light emitting diode chip 320 enters the thick part 356 of the diffusion layer 355 from the fluorescence layer 330, the different thickness of the thick part 356 diffuses the light beam L. A small part of the light beam L penetrates the reflecting layer 340. A large part of the light beam L is reflected and diffused by the reflecting layer 340, entering the fluorescence layer 330 again through the thick part 356, reflected by the substrate 310 and emitted out of the thin part 357 so as to improve the uniformity of the white light L' from the light emitting diode package 320.

Figure 6:
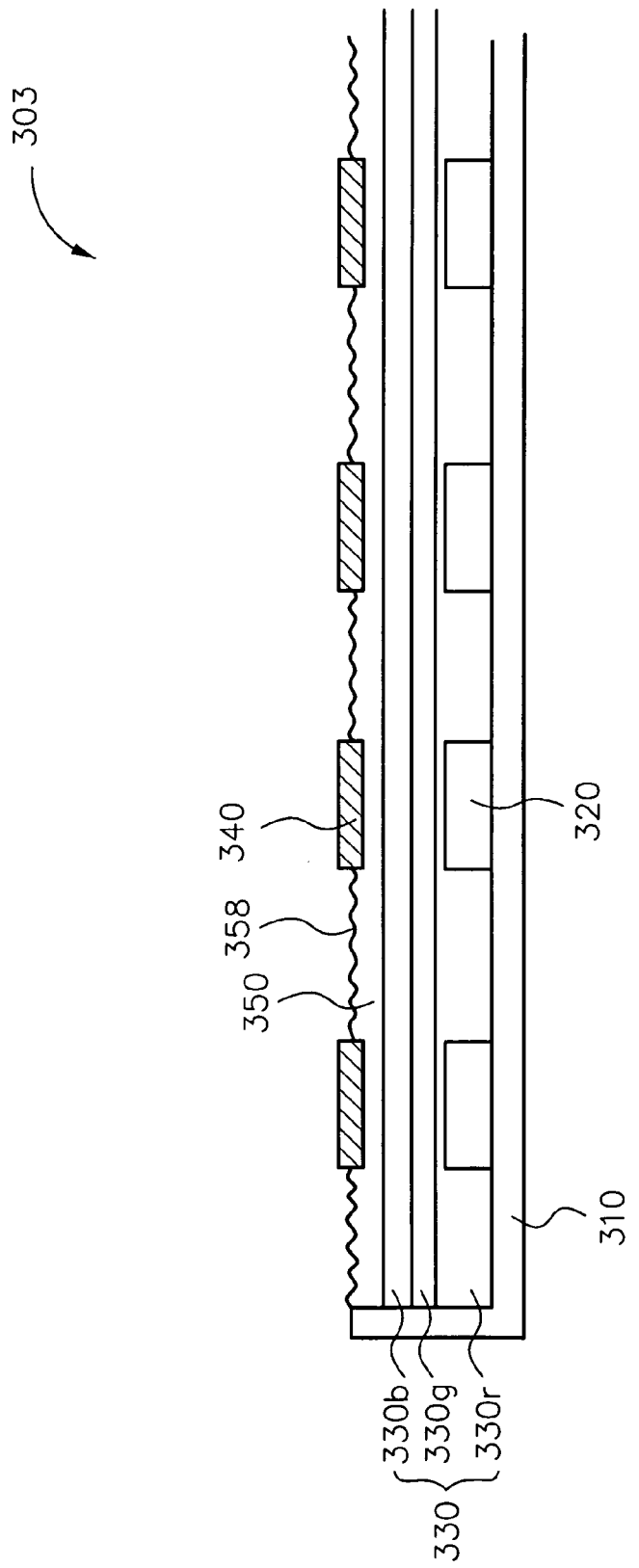
FIG. 6 a sectional view of the forth embodiment of the light emitting diode package according to the invention.

Referring to FIG. 6, the fluorescence layer 330 is formed by sequential stack of a red fluorescence layer 330r, a green fluorescence layer 330g, and a blue fluorescence layer 330b. Compared with FIG. 3, the light emitting diode chips 320 in the embodiment are an ultraviolet light emitting diode chips. The red fluorescence layer 330r, the green fluorescence layer 330g, and the blue fluorescence layer 330b are simulated by the ultraviolet light of the ultraviolet light emitting diode chips to convert the ultraviolet light into the white light.

Based on the embodiments of the invention, structures of the light emitting diode packages 300,301,302 and 303 may be combined to obtain other different embodiments. For example, add a diffusion layer 350 in FIG. 4 or replace the planar reflecting layer 340 into the circular reflecting layer 341.

In summary, the above embodiments may have at least one of the following advantages:

1. A reflecting layer 340 is disposed to reflect the light beam L back to the fluorescence layer 330 , so that the light beam L with high directivity may be emitted out between two adjacent light emitting diode chips 320 after back and forth movement in the fluorescence layer 330 so as to improve uniformity of the white light L' emitted from the light emitting diode package 300.

2. The light beam is mixed uniformly in the light emitting diode package 300, and solves the problem of big size of the lengthened or thickened light guide plate when the light emitting diodes are disposed in the light guide plate of the conventional backlight module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light emitting diode package, comprising:
a substrate;
a plurality of light emitting diode chips, disposed on the substrate;
a fluorescence layer, disposed on the substrate and covering the light emitting diode chips; and
a plurality of reflecting layers, disposed above the fluorescence layer and right above the light emitting diode chips respectively, wherein the reflecting layers are disposed on a same level, the fluorescence layer has a light emitting surface, and the plurality of reflecting layers cover a top part of the light emitting surface, and do not cover other top parts of the light emitting surface.

2. The light emitting diode package of claim 1, wherein each of the reflecting layers is a diffusion reflecting layer with high reflectivity, high diffusivity, and low transmittance.

3. The light emitting diode package of claim 1, wherein a profile of each of the reflecting layers is selected from the group consisting of a semicircle, a circular arc, and a polygon with an arc.

4. The light emitting diode package of claim 1, wherein each of the reflecting layers has a lower surface facing the corresponding light emitting diode chip, the lower surfaces of the reflecting layers are coated by a plurality of diffusion particles, and material of the diffusion particles is selected from the group consisting of silicon dioxide and polymethyl methacrylate.

5. The light emitting diode package of claim 1, further comprising a diffusion layer disposed above the fluorescence layer.

6. The light emitting diode package of claim 5, wherein a surface of the diffusion layer comprises a blasting-sand structure.

7. The light emitting diode package of claim 5, wherein the diffusion layer comprises a plurality of diffusion particles, and material of the diffusion particles is selected from the group consisting of silicon dioxide and polymethyl methacrylate.

8. The light emitting diode package of claim 5, wherein the diffusion layer has a plurality of thick parts and a plurality of thin parts, the thick parts are disposed above the light emitting diode chips, and the thin parts are disposed between two adjacent reflecting layers respectively.

9. The light emitting diode package of claim 8, wherein a surface of the thick part contacting the fluorescence layer is selected from the group consisting of a semicircle, a circular arc, and a polygon with an arc.

10. The light emitting diode package of claim 1, wherein the fluorescence layer comprises a red fluorescence layer, a green fluorescence layer, and a blue fluorescence layer.

* * * * *